Sept. 1, 1936.   R. C. JARMIN   2,053,194
CONDIMENT HOLDER
Filed Aug. 13, 1935   2 Sheets-Sheet 1
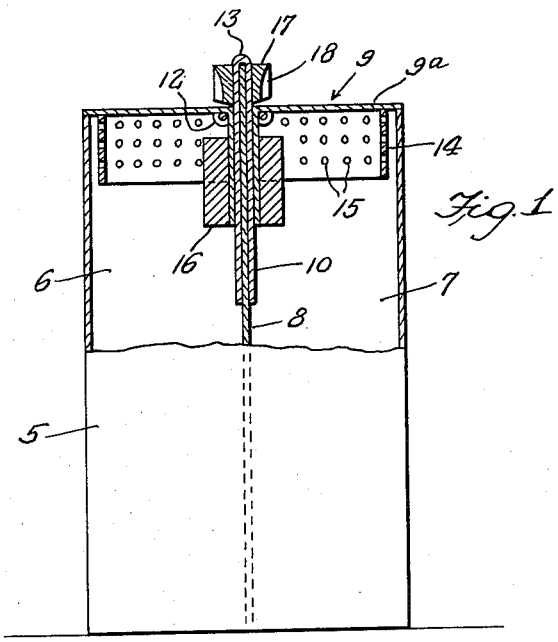
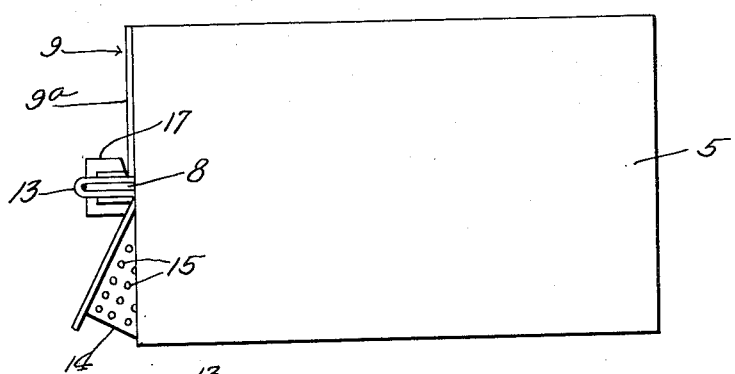
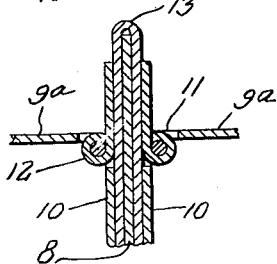
Inventor
Roland C. Jarmin,
By Clarence A. O'Brien
Attorney Sept. 1, 1936.　　　R. C. JARMIN　　　2,053,194

CONDIMENT HOLDER

Filed Aug. 13, 1935　　　2 Sheets-Sheet 2

Inventor

Roland C. Jarmin,

By Clarence A. O'Brien

Attorney

Patented Sept. 1, 1936

2,053,194

UNITED STATES PATENT OFFICE 2,053,194

CONDIMENT HOLDER

Roland C. Jarmin, Osceola, Nebr., assignor of one-half to Wilhelm S. Thelen, Osceola, Nebraska Application August 13, 1935, Serial No. 36,004

3 Claims. (Cl. 65—45)

This invention relates to condiment holders and the object of the invention is to provide a salt and pepper shaker which will be sanitary and which will protect the condiment against dampness.

In accordance with the present invention there is provided a single receptacle having a compartment for salt and a second compartment for pepper together with improved closure means for each compartment which latter will serve to protect the contents of the compartment from dust, dirt, etc., and also against dampness.

A further object of the invention is to provide an improved closure for a combination salt and pepper shaker.

The invention together with its objects and advantages will be best understood from a study of the following description taken in connection with the accompanying drawings wherein:

Figure 1 is an elevational view of certain parts of the condiment holder and other parts broken away and shown in section.

Figure 2 is a side elevational view of the condiment holder disposed in a horizontal position and with one of the closures in open position.

Figure 3 is a fragmentary detail sectional view showing the end mounting for the closure as well as the manner of securing the closure in position on the receptacle forming part of the condiment holder.

Figure 4:
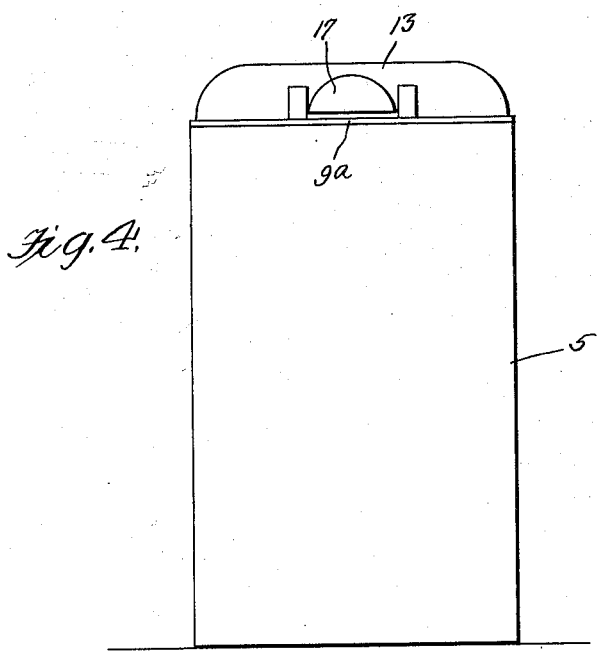
Figure 4 is an elevational view of the condiment holder with the same disposed in a vertical position.

Referring to the drawings by reference numerals it will be seen that the improved condiment holder comprises a main receptacle 5 the same being substantially cylindrical and open at its top. Internally, the receptacle 5 is provide in two compartments 6 and 7, one compartment being adapted to contain for example salt, and the other compartment being adapted to contain for example pepper. Dividing the receptacle 5 into the two compartments 6 and 7 is a partition 8 which at one end projects outwardly beyond the open end of the receptacle 5.

For each of the compartments 6 and 7 there is provided a closure 9.

The closure 9 comprises a semi-circular disk 9a provided at one edge with a semi-circular flange 10, and at the flange edge being notched as at 11 to accommodate hinges 12 through the medium of which the closure is hinged to one side of a substantially U-shaped clip 13. Secured to the underside of the disk 9a, and having its end edges disposed adjacent the opposite edges of the flange 10 is a semi-cylindrical screen 14. The screen 14 is in the form, preferably, of a metal plate provided with perforations 15, and the same fits within the proper compartment 7 in a manner clearly shown in Figure 1, and with the edges of the disk 9a resting on the edges of the wall of the receptacle 5 as also best shown in Figure 1.

Figure 6:
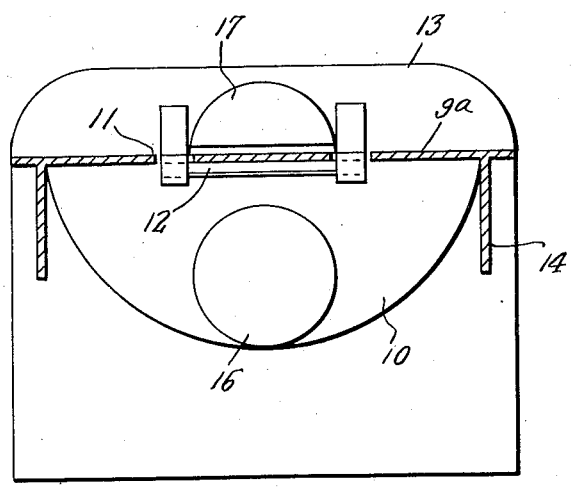
Figure 6 is a view partly in section and partly in elevation of a spring clip and closure member associated therewith.
Figure 5:
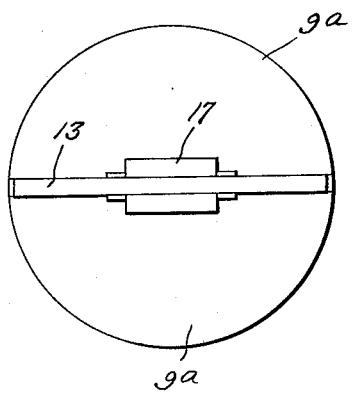
Figure 5 is a top plan view.

Normally urging the closure to a closed position is a weight 16 in the form of a disk and secured to the flange 10 which is also shown in Figures 1 and 6.

To facilitate removal and replacement of the closure 9 and clip 13 as a unit, and also serving as a stop for limiting outward swinging movement of the closure to open disposition there are secured to opposite sides of the clip 13 combination stop and finger plates 17 provided on their exposed faces with depressions 18 to accommodate the fingers.

In applying the closure to the receptacle 5, the clip 13 is slipped onto the partition 8 to straddle the same in a manner shown, thus placing the closures 9 over the respective compartments 6 and 7, the closure structure being manipulated as a unit by placing the thumb of one hand in the recess 18 of one of the combination finger and stop pieces 17, and the index finger in the recess 18 of the member 17 on the opposite side of the clip 13 as thought to be apparent.

When it is desired to discharge a portion of the contents of one of the compartments 6, or 7, as the case may be, the receptacle 5 is then tilted somewhat to the position shown in Figure 2 whereupon the proper closure 9 will swing to the position also shown in Figure 2 so that the contents of the proper compartment may discharge through the perforations of the screen 14. When the holder is turned to vertical position shown for example in Figures 1 and 4 the closure will by gravity return to its normal closed position which is the position shown in Figure 1.

It will thus be seen that a condiment holder embodying the features of the present invention will be sanitary in that it will exclude dust, dirt, etc. from the contents of the compartments 6 and 7 and will also serve to protect the contents against moisture.

Having thus described the invention, what is claimed as new is:

1. A combined salt and pepper shaker including a receptacle having a longitudinal partition therein dividing the same into two compartments, a U-shaped clip straddling said partition at one end of the latter, closure plates for the compartments hingedly connected to opposite sides of said clip, and substantially semi-cylindrical shields secured at one edge to the under side of said plates and adapted to extend down into the compartments in space relation to the walls of the receptacle, said shields being perforated for the passage of the contents of the compartments therethrough when said closure plates are in open position, weights connected with said plates at the hinged edges of the latter and disposed at right angles to the plates for normally urging the plate into closed position.

2. A combined salt and pepper shaker including a receptacle having a longitudinal partition therein dividing the same into two compartments, a U-shaped clip straddling said partition at one end of the latter, closure plates for the compartments hingedly connected to opposite sides of said clip, and substantially semi-cylindrical shields secured at one edge to the under sides of said plates and adapted to extend down into the compartments in space relation to the walls of the receptacle, said shields being perforated for the passage of the contents of the compartments therethrough when said closure plates are in open position, weights connected with said plates at the hinged edges of the latter and disposed at right angles to the plates for normally urging the plates into closed position, and stops on opposite sides of the clip and arranged with respect to said plates for limiting swinging movement of the plates to open position.

3. A combined salt and pepper shaker including a receptacle having a longitudinal partition therein dividing the same into two compartments, a U-shaped clip straddling said partition at one end of the latter, closure plates for the compartments hingedly connected to opposite sides of said clip, and substantially semi-cylindrical shields secured at one edge to the under sides of said plates and adapted to extend down into the compartments in space relation to the walls of the receptacle, said shields being perforated for the passage of the contents of the compartments therethrough when said closure plates are in open position, weights connected with said plates at the hinged edges of the latter and disposed at right angles to the plates for normally urging the plates into closed position, and stops on opposite sides of the clip and arranged with respect to said plates for limiting swinging movement of the plates to open position, and said stops having exposed recessed surfaces for accommodating the fingers whereby said stops also serve as a handle for the clip to facilitate disengagement of the clip from the partition.

ROLAND C. JARMIN.